United States Patent Office 3,134,257  
Patented May 26, 1964

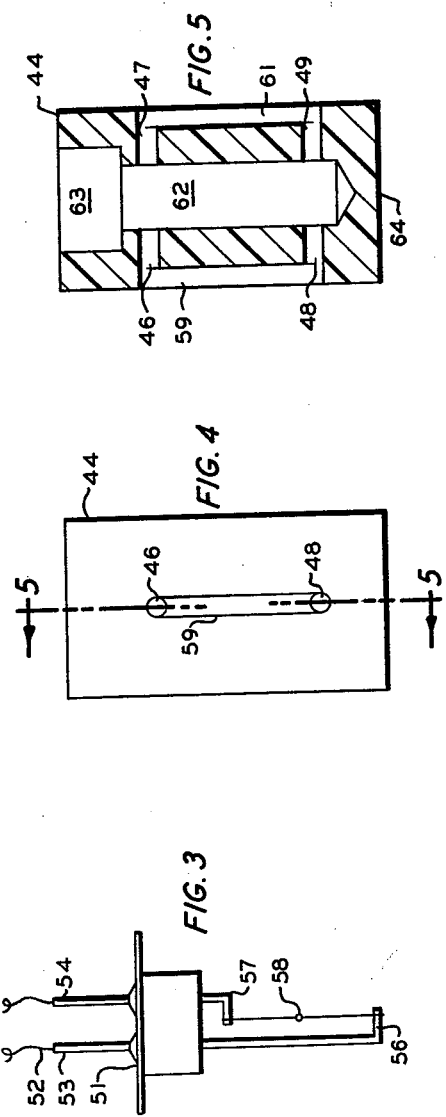
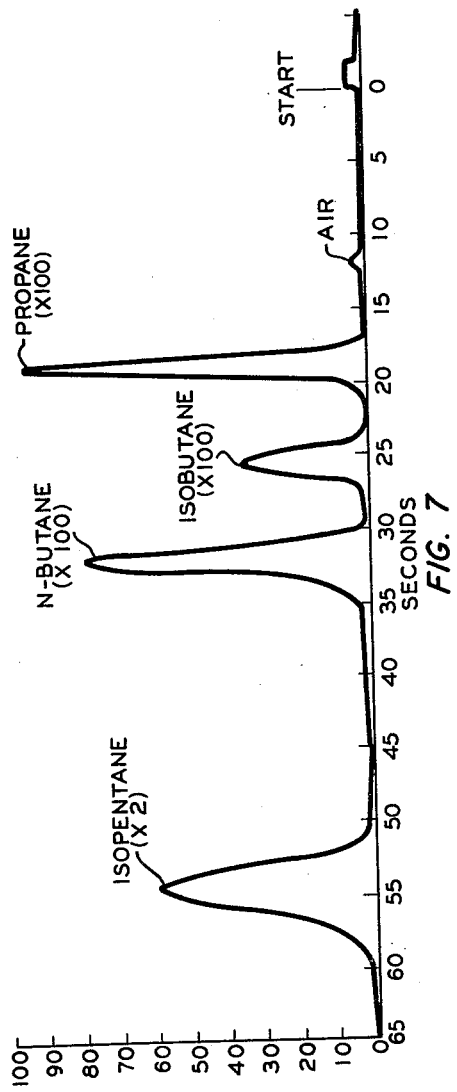

3,134,257  
FAST RESPONSE THERMAL CONDUCTIVITY CELL  
Marvin E. Reinecke, Bartlesville, Okla., assignor to Phillips Petroleum Company, a corporation of Delaware  
Filed Feb. 23, 1960, Ser. No. 10,396  
3 Claims. (Cl. 73—27)

This invention relates to improvements in chromatography. In another aspect it relates to an improved design for the thermal conductivity cell of a gas chromatographic analyzer. In still another aspect it relates to inserting an insulating sleeve, which has been designed to permit diffused gas flow past the sampling thermistor, in the thermistor well, thereby reducing dead volume, gaining fast response time for said cell, and minimizing the inherent flow sensitivity of the thermistor element.

Conventionally, as the segregated constituents emerge from the sorption column, they are suitably detected through the sensing of characteristic properties, such as thermal conductivity, density, refractive index, and the like, which identify the several components and measure the relative amounts thereof. In high speed chromatography, I have found that two of the major objectives in the design of a thermal conductivity cell are: (1) small volume surrounding the sampling thermistor for fast response, and (2) minimal fluctuation in the gas flow rate from the columns for reducing the distorting effect of the inherent flow sensitivity of the thermistor.

To achieve the desired small size of the flow chambers, the thermistor wells can be reduced in cross-sectional area to a point of slight tolerance between the thermistor assembly and the well sides. However, this only seemingly simple solution increases the probability of "shorting out" of the thermistor against the metal sides of the thermistor chamber, if the thermistor becomes even slightly warped. Moreover, a compromise has to be reached in reducing the thermistor well volume below 0.25 cc. If the volume is reduced much further, thermistor sensitivity will be sacrificed, since thermal conductivity measurements are also proportional to the layer of gas occuring between the thermistor bead and the walls of the chamber.

As noted, the second major design problem is the inherent flow sensitivity of a thermistor, which is usually resolved by avoiding placing the thermistor element directly in line with the gas stream from the discharge end of the column. If a straight diffusion cavity is employed for the sampling thermistor, as is often done with the reference thermistor of a T.C. cell, a slow response time is inevitable. This is because of the slowed sensitivity of a cell of this geometry to the sharp and closely spaced peaks of the segregated constituent flow from the column. At the other extreme in design, the placing of the sample thermistor directly in the gas flow path gives the fast response desired in high speed chromatography. As noted, because of the inherent flow sensitivity of thermistors, this thermistor arrangement greatly increases the probability of inaccuracy in recorder readings with changing flow rates, as columns are frequently interchanged in a multi-column chromatographic analyzer. It is thus apparent that neither one of these design geometries alone is satisfactory in high speed, multi-column, gas chromatography.

A combination of these two cell geometries has been sought in the so-called pretzel design, which seeks to incorporate the desirable features of diffusion and direct flow into one cell design to minimize thermistor flow sensitivity. However, the designs along this line still suffer from an excess of dead chamber volume, with its resultant slow response of about one second. This is still unacceptable for high-speed chromatography. Furthermore, the devices developed are accompanied by excessive fabricating work in drilling holes, and the plugging of certain of these holes, in the metal block from which the thermal conductivity cell must be built to give a pretzel configuration. The present invention accomplishes the pretzel design in a relatively simple manufacturing procedure, that also gives the desired minimal dead space and is free from short circuiting, with the result that the required high speed of response, on the order of 0.2 of a second, is readily achieved, provided the most commonly used carrier gases of helium or hydrogen are employed.

This improved T.C. cell is constructed by machining a dielectric plastic sleeve to fit into a standard size thermistor chamber so as to leave enough chamber space to receive the thermistor assembly while allowing the optimum wall clearance. The sleeve is further provided with four holes, divided into two pairs with each pair of transversely drilled holes on two diameter lines, oppositely disposed near the ends of the plastic sleeve in order to allow ingress and egress of the gas through the reduced thermistor chamber, but in a partially diffused flow path relative to the thermistor bead. This invention eliminates the prior practice of drilling of many complete passages through the metal block, several of which must be plugged to define a pretzel flow path, and which only partially reduced dead space in the thermistor chamber.

Accordingly, it is an object of this invention to provide an improved design for the thermal conductivity cell of a high speed, chromatographic analyzer.

It is another object to provide a pretzel design for the thermistor chamber that gives fast response and minimizes the effect of the inherent flow sensitivity of a thermistor.

It is a further object to provide a simple method of manufacturing a thermal conductivity cell of the pretzel design.

Further objects and advantages of this invention will become apparent to those skilled in the art from a study of the accompanying disclosure, appended claims, and drawing, in which:

FIGURE 3 is an enlarged elevational view of the thermistor element of the thermal conductivity cell of this invention;

FIGURE 4 is an enlarged side elevational view of the plastic sleeve of this invention;

FIGURE 5 is a sectional view taken along line 5—5 of FIGURE 4;

FIGURE 7 is a graphic illustration of an analysis made with the analyzer of FIGURE 1.

Figure 1:
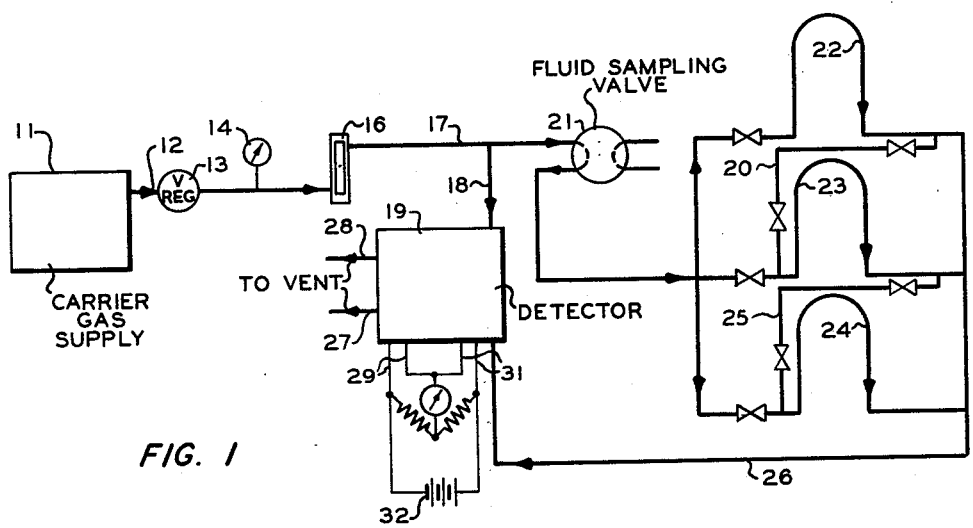
FIGURE 1 is a schematic flow diagram of the chromatographic analyzer embodying the thermal conductivity cell of this invention.

Referring now to the drawings in detail, wherein like parts have been designated with like reference numerals, and to FIGURE 1 in particular, there is shown a carrier gas supply 11, having an outlet conduit 12 which passes to constant pressure outlet valve 13. Further downstream is conduit 12 is pressure gauge 14, followed by flow meter 16. Conduit 17 from the top of flow meter 16 is provided with a side conduit 18 leading to the reference thermistor chamber (not shown) of a thermal-conductivity type of detector 19. Further downstream, conduit 17 is provided with a fluid sampling valve 21. Columns 22, 23, and 24, each being filled with an appropriate liquid sorbent, usually in pulverized form, are operated in parallel or series, as desired, downstream of fluid sampling valve 21. Conduits 20 and 25 connect the columns, and are provided with suitable valves for the columns in any sequence that is preferred. Conduit 26 leading from the columns enters the sampling side of detector 19. Detector 19 is provided with outlet vents 27 and 28 for venting the gas streams which flow past the reference and sampling thermistors (not shown). Cell 19 is further provided with two pairs of electrical leads 29 and 31 which transmit the varying electrical signals from the thermistors to the appropriate arms of a bridge circuit, generally designated 32.

Figure 2:
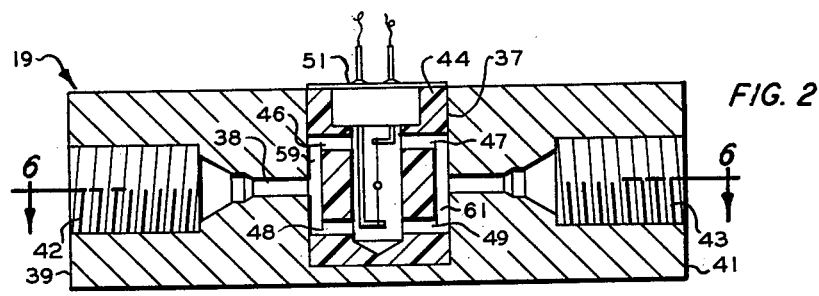
FIGURE 2 is a detailed sectional view of one side of the thermal conductivity cell of FIGURE 1.

In FIGURE 2 is shown a sectional view of this invention. A rectangular metal block, generally designated 19, preferably of stainless steel, or the like, for corrosion resistance, is provided with a vertical, generally cylindrical chamber 37, being bored from the top surface of block 19 and which penetrates most of the height of the block. A circular passageway 38 traverses chamber 37 along a horizontal line from one vertical side 39 of block 19 to the opposing vertical side 41 thereof. Horizontal passage 38 is first counter-bored, and then counter sunk from sides 39 and 41, to form generally cylindrical chambers 42 and 43, respectively. Counter bores 42 and 43 are threaded to receive inlet nuts for sealably linking gas tubing to both ends of passageway 38. A generally cylindrical sleeve 44, preferably machined from a corrosion-resistant material, and thermosetting plastic, such as Teflon (a polymer of tetrafluoroethylene) or Kel-F, is adapted to fit tightly into chamber 37. Two pairs of opposing passageways, 46, 47, 48 and 49, are provided in the vertical sides of sleeve 44. Each pair is located on a diameter line, which are in parallel relationship, and spaced approximately equidistant from the middle point of sleeve 44. Sleeve 44 is adapted to receive through its upper end a mounted thermistor assembly 51, which seats tightly therein, and is better seen in FIGURE 3.

In FIGURE 3 is shown the mounted thermistor assembly 51 designed to function in this invention. Electrical leads 52 from the appropriate arm of a bridge circuit (shown in FIGURE 1) enter the thermistor assembly 51 through vertical tubes 53 and 54 affixed to the top thereof. The tubes terminate below the main portion of assembly 51 at different heights to provide the posts 56 and 57 for stringing a support wire and bead 58 therebetween. It should be noted that thermistor assembly 51 is designed to locate thermistor bead 58 approximately equidistant between the two diameter lines on which sleeve passages 46, 47, 48 and 49 are located, as shown in FIGURE 1.

In FIGURE 4 is shown a side elevational view of the sleeve 44 of this invention. A channel 59 is provided between passages 46 and 48 so as to permit diffusion of the flow entering from passage 38 of block 19 toward sleeve passages 46 and 48. A similar channel 61 (as seen in cross-section in FIGURE 5) is provided to permit confluence of the gas flow through passages 47 and 49, which then flow out of the downstream end of passage 38.

In FIGURE 5 is shown a sectional view taken along line 5—5 of FIGURE 4, in which the inner space 62 defined by sleeve 44 is counter-bored in its upper end to form space 63 adapted to receive the body of thermistor assembly 51. Chamber 62 of sleeve 44 is closed at the bottom side 64 of sleeve 44, to prevent any gas escape from chamber 62 other than through passages 47 and 49.

Figure 6:
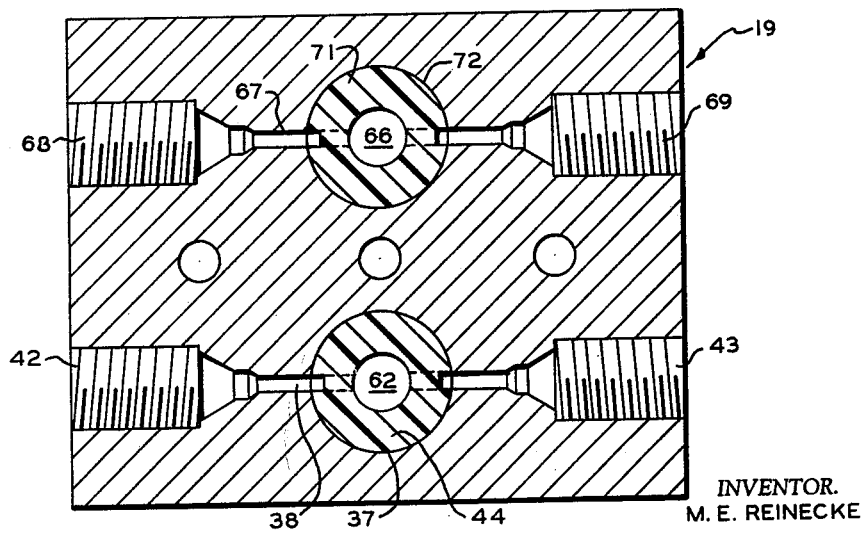
FIGURE 6 is a sectional view taken along line 6—6 of FIGURE 2.

In FIGURE 6 is shown a sectional view taken along line 6—6 of FIGURE 2, with the thermistor assemblies removed. Block 19 is provided with a companion chamber 66 for a thermistor assembly, traversed by horizontal passageway 67, which is provided with threaded, cylindrical chambers 68 and 69, at its ends. A sleeve 71, identical to sleeve 44, is inserted in chamber 72. Either of these reduced chambers, 62 or 66, can be employed as the receptacle for the mounted thermistor assembly which senses the changes in thermal conductivity of the gas stream entering detector 19 from columns 22, 23 or 24 of FIGURE 1 via conduit 26. The other chamber then serves as the receptacle for the reference thermistor of detector 19, which measures the carrier gas stream entering detector 19 through side conduit 18.

In operation, a sample-charged carrier gas stream from one or more of the chromatographic columns, 22, 23 or 24, enters detector 19 through conduit 26 and chamber 42. The gas stream flows through passageway 38 to the outside of sleeve 44. The stream diverges in channel 59, with roughly half passing through passage 46 into inner chamber 62, while the remainder enters through passage 48. The gas undergoes a definite amount of diffusion in cavity 62 before escaping out both passageways 47 and 49, into external channel 61, and it is vented through the downstream side of passageway 38 and chamber 43. In this cell construction, sudden fluctuations in the gas flow rate entering detector 19 through conduit 26, are damped by the position of bead 58 midway between the main gas flow streams through chamber 62. Simultaneously, the continuous bleeding of carrier gas to the detector via conduit 18, chamber 68, passage 67, past the reference thermistor in chamber 66, the downstream side of passage 67, and is vented through chamber 69, gives a constant sampling of the carrier gas for balancing of the bridge circuit, whenever no sample is flowing past the sampling thermistor.

In FIGURE 7 is shown the results of analyzing sample of hydrocarbon gas using helium as carrier gas. The analysis requires only one minute and using peak height method for converting the data shows that the sample contained approximately 46 mol percent propane, 17 mol percent isobutane, and 37 mol percent normal butane. The combined air and isopentane amounted to less than 1 mol percent of the sample. This chromatogram shows the fine resolution that can be achieved by employing the thermal conductivity cell of this invention.

While ceramic or wood are acceptable materials from which to fabricate the cylindrical sleeve used in this invention, plastics are preferred because of their ease of fabrication, their usual unbreakability, resistance to corrosive attack and they will not absorb hydrocarbons. Polyethylene is preferred to polystyrene because it is tougher, chemically inert and shock resistant; and Teflon (polytetrafluoroethylene) or Kel-F (polychlorotrifluoroethylene) are the most preferred because they are chemically resistant to almost all reagents.

Various modifications and alterations of this invention will become apparent to those skilled in the art without departing from the scope and spirit of this invention and it should be understood that the latter is not necessarily limited to the aforementioned discussion and accompanying drawing.

That which is claimed is:

1. A thermal conductivity cell, adaptable for use in pairs, for a high-speed chromatographic analyzer comprising, in combination, a metal block, a thermistor chamber therein, first conduit means of small volume for passing a sample-charged carrier gas to said thermistor chamber, second conduit means for conducting said carrier gas from said thermistor chamber, a generally cylindrical dielectric sleeve adapted to seat tightly into said thermistor chamber and substantially reducing the volume thereof, thermistor means centrally disposed in said reduced thermistor chamber for sensing changes in thermal conductivity of said sample-charged carrier gas, passage means between the outside and inside of said sleeve for permitting said carrier gas to enter and exit from said thermistor chamber in a diffused path past said thermistor means, said passage means comprising first and second passages traversing said sleeve and communicating between the outside of said sleeve and the inside thereof, said first and second passages disposed intermediate the ends of said sleeve and approximately equidistant about the midpoint thereof, third and fourth passages communicating between the inside and the outside of said sleeve and diametrically opposite said first and second passages, a first channel on the outside of said sleeve communicating between said first and second passages, a second channel on the outside of said sleeve communicating between said third and fourth passages, said first conduit means communicating with said first channel and said second conduit means communicating with said second channel, whereby high speed of response of said thermistor means is achieved and the flow sensitivity thereof is minimized.

2. The apparatus of claim 1 wherein the dielectric sleeve is fabricated from a plastic selected from the group consisting of polytetrafluoroethylene, polychlorotrifluoroethylene, polyethylene and polystyrene.

3. A thermal conductivity detector for a high speed, multi-column chromatographic analyzer, comprising, in combination, a metal block having first and second vertical cylindrical chambers provided therein, said first and second chambers extending from regions exterior of said block and adjacent one side thereof to respective points intermediate a second opposing side thereof, said first chamber having a horizontal first passage traversing said first chamber intermediate the ends thereof and extending between said first chamber and the regions exterior of said block adjacent to third and fourth opposing sides of said block, said second chamber having a horizontal second passage traversing said second chamber and similarly disposed as said first passage, said third and fourth sides being right angularly disposed to said first and second sides, said first and second horizontal passages each having a counter bore at both ends, each of said counter bores being threaded to receive an inlet nut, a first generally cylindrical dielectric sleeve adapted to seat tightly into said first chamber, third and fourth passages traversing said first sleeve and communicating between the outside of said first sleeve and the inside thereof, said third and fourth passages disposed intermediate the ends of said first sleeve and approximately equidistant about the midpoint thereof, fifth and sixth passages communicating between the inside and the outside of said first sleeve and diametrically opposite said third and fourth passages, a first channel on the outside of said first sleeve communicating between said third and fourth passages, a second channel on the outside of said first sleeve communicating between said fifth and sixth passages, a first mounted thermistor assembly adapted to seat tightly in the recessed upper portion of said first sleeve with the bead of said first thermistor assembly disposed about midway between the two horizontal axes described by said third, fourth, fifth, and sixth passages penetrating said first sleeve, a second generally cylindrical plastic sleeve adapted to fit tightly into said second chamber, seventh and eighth passages traversing said second sleeve and communicating between the outside of said second sleeve and the inside thereof, said seventh and eighth passages disposed intermediate the ends of said second sleeve and approximately equidistant from the midpoint thereof, ninth and tenth passages communicating between the inside and the outside of said second sleeve and diametrically opposite said seventh and eighth passages, a third channel on the outside of said second sleeve communicating between said seventh and eighth passages, a fourth channel on the outside of said second sleeve communicating between said ninth and tenth passages, a second mounted thermistor assembly adapted to seat tightly in the recessed upper portion of said second sleeve with the bead of said second thermistor assembly disposed about the midway between the two horizontal axes described by said seventh, eighth, ninth, and tenth passages, whereby high speed of response of said cell is achieved and the flow sensitivity of said first and second thermistor assemblies is minimized.

References Cited in the file of this patent

UNITED STATES PATENTS

| | | |
|---|---|---|
| 2,319,516 | Phelps | May 18, 1943 |
| 2,557,008 | Poole | June 12, 1951 |
| 2,652,315 | McEvoy | Sept. 15, 1953 |
| 2,687,036 | Minter | Aug. 24, 1954 |
| 2,926,520 | Schmauch | Mar. 1, 1960 |

OTHER REFERENCES

Vapor Fractometry (Gas Chromatography); "A Powerful New Tool in Chemical Analysis," by H. H. Hausdorff; published September 1955; pages 6–8 relied on.

Journal of Chromatography; "Review of Gas-Liquid Chromatography," by C. J. Hardy et al.: vol. 2, 1959; pp. 22–24 relied on.